United States Patent [19]
Yokota et al.

[11] Patent Number: 5,633,841
[45] Date of Patent: May 27, 1997

[54] OPTICAL DISC RECORDING/REPRODUCING APPARATUS HAVING AUTOMATIC PROTECTION OF PREVIOUSLY RECORDED DATA

[75] Inventors: Teppei Yokota; Nobuyuki Kihara; Junichi Aramaki, all of Tokyo, Japan

[73] Assignee: Sony Corporation, Tokyo, Japan

[21] Appl. No.: 427,726

[22] Filed: Apr. 24, 1995

Related U.S. Application Data

[63] Continuation of Ser. No. 185,927, filed as PCT/JP93/00668, May 21, 1993 published as WO93/24929, Dec. 9, 1993, abandoned.

[30] Foreign Application Priority Data

May 25, 1992 [JP] Japan .................... 4-157411

[51] Int. Cl.$^6$ ............................. G11B 17/22
[52] U.S. Cl. ................... 369/32; 369/54; 369/58
[58] Field of Search ................. 369/32, 13, 54, 369/53, 47–48, 116, 124, 58–59, 33, 83, 44.32, 44.25

[56] References Cited

U.S. PATENT DOCUMENTS

| | | |
|---|---|---|
| 5,153,861 | 10/1992 | Maeda et al. .................. 369/32 |
| 5,224,087 | 6/1993 | Maeda et al. .................. 369/54 |
| 5,394,383 | 2/1995 | Hira .............................. 369/32 |

FOREIGN PATENT DOCUMENTS

| | | |
|---|---|---|
| 0275972A1 | 7/1988 | European Pat. Off. . |
| 0474377A1 | 3/1992 | European Pat. Off. . |
| 0540164A1 | 5/1993 | European Pat. Off. . |
| 0543446A1 | 5/1993 | European Pat. Off. . |
| 0540164 | 5/1993 | European Pat. Off. . |
| 0571191 | 11/1993 | European Pat. Off. . |

*Primary Examiner*—Ali Neyzari
*Attorney, Agent, or Firm*—Limbach & Limbach L.L.P.

[57] ABSTRACT

Record position information is recorded in a lead-in area disposed on an innermost peripheral side of a disc. When a record commanding means for commanding a start of recording operation is operated while a reproducing operation of a reproducing means is being stopped, a recording head is moved to a blank area on the disc which is detected on the basis of the record position information recorded in the lead-in area and input data is recorded in the blank area. When the record commanding means for commanding a start of recording operation is operated while the reproducing operation of the reproducing means is being paused, the recording head is moved to a position of a signal which has been outputted when the recording operation has been paused and the input data is recorded from this position.

8 Claims, 9 Drawing Sheets

| | 16 BITS EVEN M | | 16 BITS ODD M | |
|---|---|---|---|---|
| | WmB | WmA | WmB | WmA |
| | MSB  LSB | MSB  LSB | MSB  LSB | MSB  LSB |
| | d1  d8 | d1  d8 | d1  d8 | d1  d8 |
| 0 | 0 0 0 0 0 0 0 0 | 1 1 1 1 1 1 1 1 | 1 1 1 1 1 1 1 1 | 1 1 1 1 1 1 1 1 | ← A1
| 1 | 1 1 1 1 1 1 1 1 | 1 1 1 1 1 1 1 1 | 1 1 1 1 1 1 1 1 | 1 1 1 1 1 1 1 1 |
| 2 | 1 1 1 1 1 1 1 1 | 1 1 1 1 1 1 1 1 | 1 1 1 1 1 1 1 1 | 0 0 0 0 0 0 0 0 |
| 3 | CLUSTER | CLUSTER | 0 0 0 0 0 0 0 0 | 0 0 0 0 0 0 1 0 | ← A2
| 4 | 0 0 0 0 0 0 0 0 | 0 0 0 0 0 0 0 0 | 0 0 0 0 0 0 0 0 | 0 0 0 0 0 0 0 0 | ← A3
| 5 | 0 0 0 0 0 0 0 0 | 0 0 0 0 0 0 0 0 | 0 0 0 0 0 0 0 0 | 0 0 0 0 0 0 0 0 |
| 6 | "M" | "I" | "N" | "I" |
| 7 | DISC TYPE | REC POWER | FIRST TNO | LAST TNO |
| 8 | LEAD-OUT START ADDRESS | | USED SECTORS | |
| 9 | POWER CAL AREA START ADDRESS | | | | ← A4
| 10 | U-TOC START ADDRESS | | | |
| 11 | RECORDABLE USER AREA START ADDRESS | | | |
| 12 | P-FRA | P-TNO 1 | P-TNO 2 | P-TNO 3 | ← A5
| 13 | P-TNO 4 | P-TNO 5 | P-TNO 6 | P-TNO 7 |
| 14 | P-TNO 8 | P-TNO 9 | P-TNO 10 | P-TNO 11 |
| 15 | P-TNO 12 | P-TNO 13 | P-TNO 14 | P-TNO 15 |
| 16 | P-TNO 16 | | | |
| 17 | | | | |
| 73 | | | | |
| 74 | P-TNO248 | P-TNO249 | P-TNO250 | P-TNO251 |
| 75 | P-TNO252 | P-TNO253 | P-TNO254 | P-TNO255 |
| 76 | START ADDRESS | | | | ← A6
| 77 | END ADDRESS | | | |
| 78 | START ADDRESS | | | |
| 79 | END ADDRESS | | | |
| 481 | | | | |
| 482 | | | | |

HEADER: A1–A3
DATA AREA: A4–A6

Fig. 4

| | 16 BITS EVEN M | | 16 BITS ODD M | |
|---|---|---|---|---|
| | WmB | WmA | WmB | WmA |
| | MSB    LSB | MSB    LSB | MSB    LSB | MSB    LSB |
| | d1      d8 | d1      d8 | d1      d8 | d1      d8 |
| 0 | 0 0 0 0 0 0 0 0 | 1 1 1 1 1 1 1 1 | 1 1 1 1 1 1 1 1 | 1 1 1 1 1 1 1 1 |
| 1 | 1 1 1 1 1 1 1 1 | 1 1 1 1 1 1 1 1 | 1 1 1 1 1 1 1 1 | 1 1 1 1 1 1 1 1 |
| 2 | 1 1 1 1 1 1 1 1 | 1 1 1 1 1 1 1 1 | 1 1 1 1 1 1 1 1 | 0 0 0 0 0 0 0 0 |
| 3 | CLUSTER | CLUSTER | 0 0 0 0 0 0 0 0 | 0 0 0 0 0 0 1 0 |
| 4 | 0 0 0 0 0 0 0 0 | 0 0 0 0 0 0 0 0 | 0 0 0 0 0 0 0 0 | 0 0 0 0 0 0 0 0 |
| 5 | 0 0 0 0 0 0 0 0 | 0 0 0 0 0 0 0 0 | 0 0 0 0 0 0 0 0 | 0 0 0 0 0 0 0 0 |
| 6 | | | | |
| 7 | | | FIRST TNO | LAST TNO |
| 8 | | | | USED SECTORS |
| 9 | | | | |
| 10 | | | | |
| 11 | DISC | ID | P-DFA | P-EMPTY |
| 12 | P-FRA | P-TNO 1 | P-TNO 2 | P-TNO 3 |
| 13 | P-TNO 4 | P-TNO 5 | P-TNO 6 | P-TNO 7 |
| 14 | P-TNO 8 | P-TNO 9 | P-TNO 10 | P-TNO 11 |
| 15 | P-TNO 12 | P-TNO 13 | P-TNO 14 | P-TNO 15 |
| 16 | P-TNO 16 | | | |
| 17 | | | | |
| 73 | | | | |
| 74 | P-TNO 248 | P-TNO 249 | P-TNO 250 | P-TNO 251 |
| 75 | P-TNO 252 | P-TNO 253 | P-TNO 254 | P-TNO 255 |
| 76 | START ADDRESS | | | LINK-P |
| 77 | END ADDRESS | | | TRACK MODE |
| 78 | START ADDRESS | | | LINK-P |
| 79 | END ADDRESS | | | TRACK MODE |
| 481 | | | | |
| 482 | | | | |

HEADER: rows 0–2
DATA AREA: rows 3–482
B1: rows 76–79

OPTICAL DISC RECORDING/REPRODUCING APPARATUS HAVING AUTOMATIC PROTECTION OF PREVIOUSLY RECORDED DATA

This is a continuation application Ser. No. 08/185,927, filed as PCT/JP93/00668; May 21, 1993 published as WO93/24929, Dec. 9, 1993, now abandoned.

TECHNICAL FIELD

The present invention relates to an optical disc recording and/or reproduction apparatus for recording and reproducing data to and from an optical disc such as a magneto-optical disc capable of recording and reproducing data.

BACKGROUND ART

An optical disc system which records and reproduces digital audio signals to and from a magneto-optical disc with a diameter of 64 mm which is enclosed in a cartridge has been developed. In this optical disc system, with sound compression technologies, the amount of original digital audio signals is compressed to around ⅕ times thereof and recorded. Thus, using a small disc with a diameter of 64 mm, audio signals can be recorded and reproduced thereto and therefrom for around 74 minutes long with high sound quality.

In the optical disc system, when data is recorded, compressed input digital audio data is temporarily stored in a buffer memory (RAM). When a certain amount of data is stored in the memory, data is read from the memory and recorded on a disc with the magnetic field modulating method.

When data is reproduced, data reproduced from the disc is stored in a buffer memory. Then the amount of data which is required for expansion is read from the buffer memory at a constant rate, expanded and outputted. When the buffer memory becomes full with data, reproduction of data from the disc is stopped. During this time, data reading from the buffer memory is continued. Thus, even when a pickup undergoes track jump due to disturbance or the like during data reproduction from the disc, data stored in the memory can be continuously read, so that sound jump of expanded audio data can be prevented.

According to the optical disc system, by performing recording and reproduction using buffer memories as mentioned above, continuous audio data can be recorded in the physically discontinuous position on a disc. Moreover, data recording in the physically discontinuous position on a disc can be reproduced as continuous audio data.

Positions of data recorded on the disc are managed with a TOC (Table of Contents) provided on the inner circumference side of the disc. Non-record areas on the disc are also managed with the TOC.

On the other hand, at present, magnetic tapes are mainly used as media on which a user can record music programs. When a user performs recording on a magnetic tape, the user usually starts recording from the position of the magnetic tape with which a magnetic head is in contact at this point. Therefore, there is a fear that data already recorded is erroneously erased. When recording has been performed without erasing data already recorded, the beginning portion of the non-record area must be searched in advance. However, since it takes a certain time to search the beginning portion, when the user wants to start recording immediately, for example, in recording of a meeting, air check for a radio broadcasting, or the like, input information during the search of the beginning portion of the non-record areas cannot be recorded and it is dropped. Particularly, there has been no way to accomplish the desire that while a music program is reproduced, the user can record other informations immediately without erasing the music program.

It is an object of the invention to provide a recording and/or reproduction apparatus capable of recording new data without erasing data already recorded.

It is another object of the invention to provide a recording and/or reproduction apparatus which improves the operability in recording new data without erasing data already recorded.

It is still another object of the invention to provide a recording and/or reproduction apparatus capable of recording new data continuously after data previously recorded.

It is yet another object of the invention to provide a disc recording and/or reproduction apparatus capable of recording new data continuously after data being reproduced.

DISCLOSURE OF INVENTION

The invention is a disc recording and/or reproduction apparatus for accessing a non-record area on a disc so as to recording an input data on the non-record area in response to an operation of an operation switch to instruct a start of recording onto the disc in a stop state of the disc.

Furthermore, the invention is a disc recording and/or reproduction apparatus for accessing an address of an end portion of data which has been recorded previously so as to start recording of an input data from the address in response to an operation of an operation switch to instruct a start of recording onto the disc in a stop state of the disc reproduction.

The invention is a disc recording and/or reproduction apparatus for starting record of an input data from an address at which data reproduction has been paused or interrupted, in response to an operation of a operation switch to instruct a start of recording onto the disc during a reproduction of data recorded on the disc or in a state in which data reproduction has been paused.

When record is performed, since the non-record area on the disc is accessed, an unintentional erasure of music programs already recorded can be prevented.

When a record key is pushed in a stop state of disc reproduction, the address of the end portion of data which has been recorded previously is accessed so as to start recording of the input data from the address. Therefore, an erasure of the data which has been recorded previously is prevented.

When the record key is pushed during a reproduction or a state in which a reproduction has been paused, recording of the input data is started from the address at which the reproduction has been paused or interrupted, so that the data which has been recorded previously can be followed by the input data.

BEST MODE FOR CARRYING OUT THE INVENTION

Figure 1:
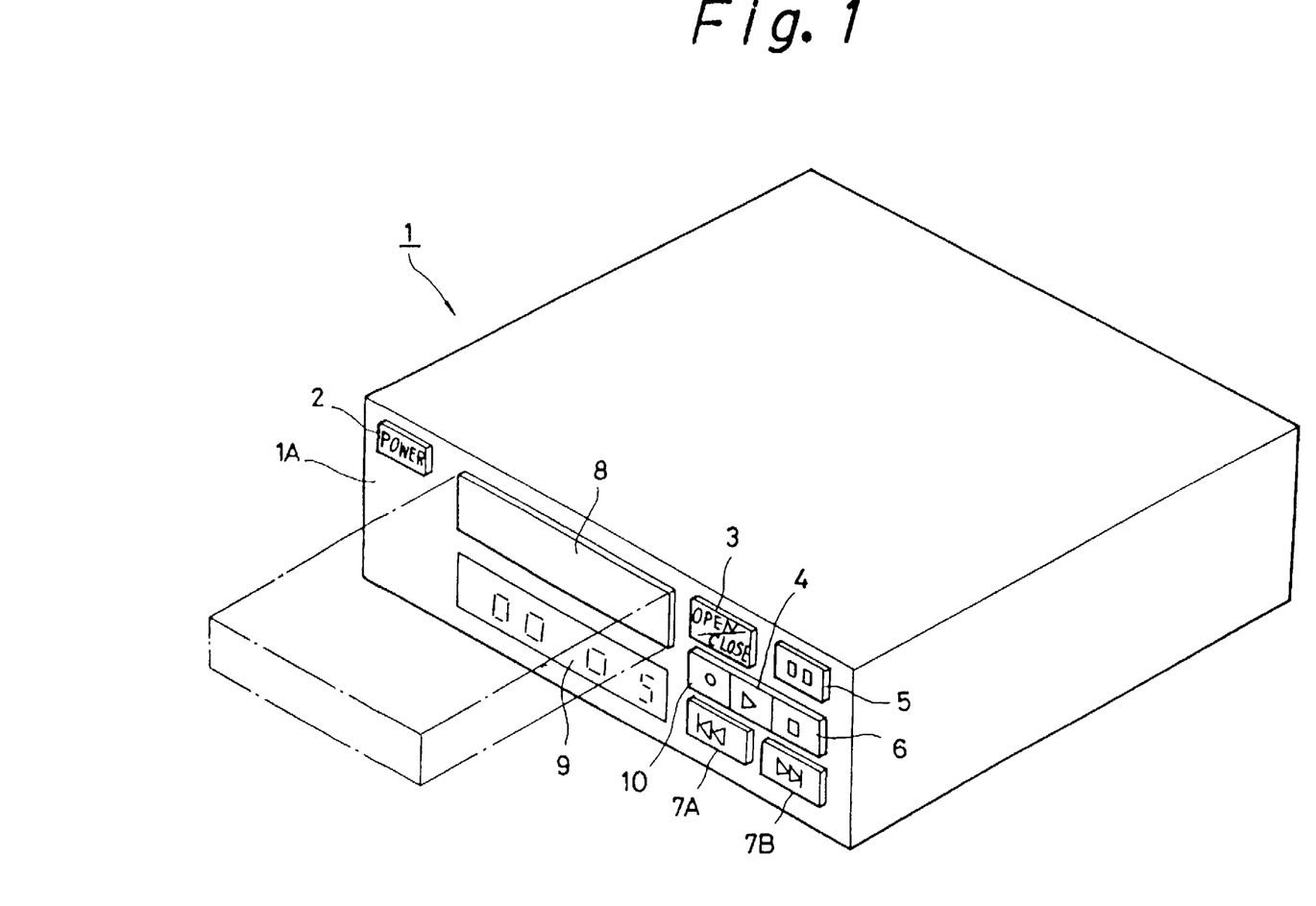
FIG. 1 is a perspective view showing an overall construction of an embodiment of the invention.

An embodiment of the invention will now be described hereunder with reference to the accompanying drawings. FIG. 1 is a perspective view showing an overall construction of an optical record and/or reproduction apparatus to which the invention has been applied. In FIG. 1, on a front panel 1A of the optical record and/or reproduction apparatus 1, a display 9 is disposed. In addition, on the front panel 1A of the optical record and/or reproduction apparatus 1, a power key 2, an open/close key 3, a reproduction key 4, a pause key 5, a stop key 6, music program select keys 7A and 7B, and a record key 10 are disposed. Reference numeral 8 denotes a disc tray which is pulled out of an opening of the front panel 1A.

By operating the open/close key 3, the disc tray 8 is pulled out of the apparatus 1 as shown by alternate short and long dash lines. On the disc tray 8, an optical disc (not shown in the figure) is mounted. When the open/close key 3 is operated again, the disc tray 8 is pulled into the apparatus 1. The optical disc is loaded on a record and/or reproduction section in the apparatus 1.

On the display 9, time information such as the total play time of the optical disc being loaded, the play time of a music program being reproduced, and the remaining play time of the music program being reproduced and the track number of the music program being reproduced are displayed. In addition, for an optical disc on which a disc name and a track name have been recorded, they are displayed on the display 9.

Figure 2:
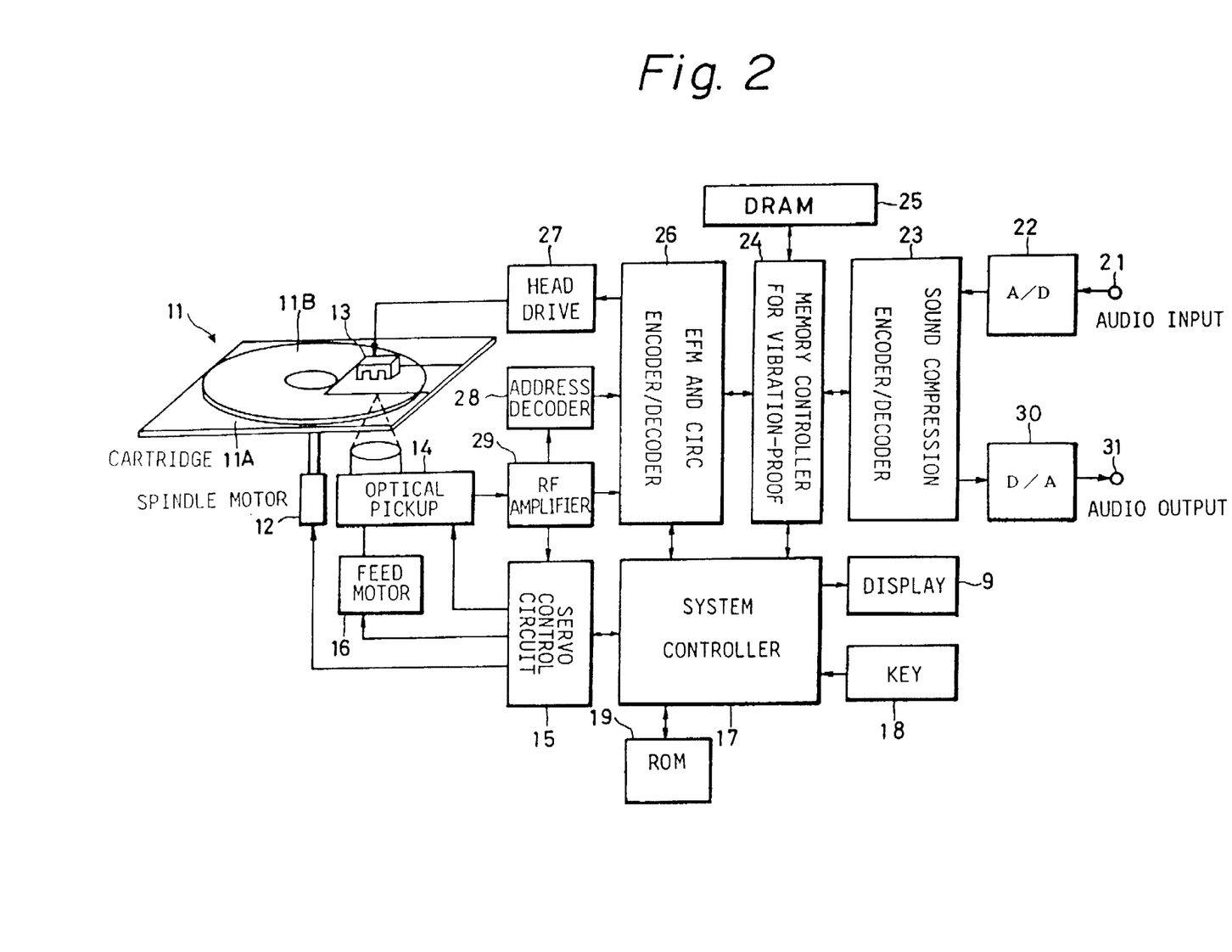
FIG. 2 is a block diagram showing the construction of the embodiment of the invention.

FIG. 2 is a block diagram showing the construction of the optical disc record and/or reproduction apparatus to which the invention has been applied. In FIG. 2, reference numeral 11 denotes a disc cartridge. An optical disc 11B with a diameter of 64 mm is contained in a cartridge 11A. There are three types of the optical disc 11B, one of which is a reproduction only optical disc, another of which is a recordable magneto-optical disc, and the other of which is an optical disc on which a dedicated reproduction area and a recordable area are mixedly provided. It is assumed here that a magneto-optical disc is contained in the disc cartridge 11.

Pregrooves which were wobbled in the radial direction are provided in the optical disc 11B on the basis of address data. Recording of data onto the optical disc 11B or reading of data recorded on the optical disc 11B is performed on the basis of address data which was obtained by detecting the pregrooves. Record areas of the optical disc 11B have a first record area on which data based on information such as a general music program is recorded and a second record area on which content information such as a so-called TOC (Table of Contents) is recorded, which will be explained later. Record data corresponding to data, a plurality of programs and a plurality of music programs are recorded on the optical disc 11B along the pregrooves.

Reference numeral 12 denotes a spindle motor which rotates the optical disc 11B at a constant linear velocity. The spindle motor 12 is controlled by a servo control circuit 15 which will be described later.

Reference numeral 13 shows a magnetic head which generates an external magnetic field. The magnetic head 13 applies a vertical magnetic field modulated according to data to be recorded onto the optical disc 11B. Reference numeral 14 denotes an optical pickup which irradiates a light beam onto the optical disc. The magnetic head 13 and the optical pickup 14 are opposed with the optical disc 11B therebetween. The magnetic head 13 and the optical pickup 14 are connected by a connecting mechanism (not shown) so that they are integrally moved in the radial direction of the optical disc 11B.

Reference numeral 15 indicates a servo control circuit. The servo control circuit 15 generates error signals such as a focusing error signal and a tracking error signal corresponding to output signals received from the optical pickup 14 through an RF amplifier 29 which will be described later. The servo control circuit 15 supplies a control signal for performing focusing servo control and tracking servo control to the optical pickup 14 on the basis of error signals being generated.

Reference numeral 16 denotes a feed motor which moves the optical pickup 14 in the radial direction of the optical disc 11B. The feed motor 16 moves the optical pickup 14 corresponding to a feed signal received from the servo control circuit 15 so as to perform a track jump operation. The feed motor 16 receives a low frequency component of the tracking error signal from the servo control circuit 15. When the optical pickup 14 is moved in the radial direction of the optical disc 11B by the feed motor 16, the magnetic head 13 is also moved in the radial direction of the optical disc 11B.

Reference numeral 17 indicates a system controller which controls the operations of individual members of the apparatus. The system controller 17 is connected to a display 9 and an input keypad 18. The input keypad 18 is disposed on a front panel 1A shown in FIG. 1. The input keypad 18 includes the power key 2, the open/close key 3, the reproduction key 4, the pause key 5, the stop key 6, the music program select keys 7A and 7B, and the record key 10. The display 9 indicates content information of the optical disc 11B such as time information (for example, a total play time, a play time of a current music program or program, and a remaining time thereof), a track number of a current music program or program, a disc name, a track name, and so forth.

Reference numeral (not shown) denotes a ROM (Read Only Memory). The ROM 19 stores time information corresponding to each cluster and each sector (which will be described later). The ROM 19 is connected to the system controller 17. Time information stored in the ROM 19 is read with data corresponding to a cluster number and a sector number obtained by the system controller 17, i.e., address data.

Reference numeral 21 shows an input terminal. Reference numeral 22 denotes an A/D converter which converts an analog audio signal received from the input terminal 21 to a 16-bit digital signal. The sampling frequency of the A/D converter 22 is 44.1 kHz.

Reference numeral 23 denotes a first sound compression encoder/decoder. The first encoder/decoder 23 compresses the amount of a digital signal received from the A/D converter 22 into approximately ⅕ that of the input signal. The first encoder/decoder 23 compresses and expands the amount of a signal by using modified DCT (Modified Discrete Cosine Transform) technique.

Reference numeral 24 denotes a memory controller which controls data write/read operations for a memory 25. The memory 25 is for example a dynamic RAM with a storage capacity of 1 Mbits. When data is recorded onto the optical disc 11B, data received from the first encoder/decoder 23 is temporarily stored in the memory 25 through the memory controller 24. When data is reproduced from the optical disc 11B, data received from a second encoder/decoder 26 is temporarily stored in the memory 25 through the memory controller 24. The second encoder/decoder 26 performs an error correction process for data read from the memory 25.

The second encoder/decoder 26 performs an eight-to-fourteen modulation (EFM) for data which has been error-corrected with CIRC (Cross Interleave Reed Solomon Code).

Reference numeral 27 denotes a driving circuit which drives the magnetic head 13. The drive circuit 27 receives record data from the second encoder/decoder 26. Reference numeral 28 denotes an address decoder which decodes an address signal which has been recorded as the above-mentioned wobbled grooves based on a reproduced signal supplied from an RF amplifier 29.

Reference numeral 30 denotes an D/A converter which converts a digital signal, which has been expanded by the first encoder/decoder 23, into an analog audio signal. The analog audio signal is outputted from an output terminal 31.

To record record data on the optical disc 11B, a light beam which is in record level is irradiated from the optical pickup 14 to the optical disc 11B so as to heat up a record layer thereof (a magneto-optical layer in this embodiment). At this point, a vertical magnetic field corresponding to record data is applied to the opposite side of the optical disc 11. The magneto-optical record layer, which is a record layer, is magnetized in the direction of the vertical magnetic field when the temperature of the magneto-optical recording layer is lowered as the light beam is moved.

Thus, data is recorded on the optical disc 11B. To read data from the optical disc 11B, a light beam with a power lower than that at the time of recording is irradiated to the optical disc 11B. The light beam is reflected by the magneto-optical record layer as an optical record layer of the optical disc 11B. The reflected light beam is detected by a pair of photodetectors of the optical pickup 14. By subtracting output signals of the pair of photodetectors, a reproduced signal of the optical disc 11B can be obtained.

Data is recorded on the optical disc 11B cluster by cluster. One cluster is composed of 36 sectors. One sector (equivalent to one subcode block of a compact disc) is composed of 98 frames. When data is recorded, the power of the light beam irradiated from the optical pickup 14 should be controlled. In addition, the length of the interleave of CIRC is 108 frames, which is longer than the length of one sector. Thus, a linking area is required between adjacent two clusters. The first three sectors of one cluster (36 sectors) are linking sectors. The next one sector is used for subdata. Thus, compressed data of one cluster (36 sectors) are recorded in 32 sectors.

The position on the disc in the recording mode is designated by an address which has been recorded by wobbling grooves formed on the disc 11B. An address recorded as wobbled grooves is detected by the address decoder 28. The address detected by the address decoder 28 is supplied to the EFM and CIRC encoder/decoder 26.

In the reproducing mode, a record signal on the optical disc 11B is reproduced by the optical pickup 14. The reproduced signal is reproduced by the optical disc 11B cluster by cluster. The reproduced signal is sent to the EFM and CIRC encoder/decoder 26 through the RF amplifier 29. The EFM and CIRC encoder/decoder 26 performs EFM demodulation and error correction processes.

An output of the EFM and CIRC encoder/decoder 26 is temporarily stored in the memory 25 through the memory controller 24. An output of the memory 25 is supplied to the sound compression encoder/decoder 23. The sound compression encoder/decoder 23 expands the amount of an audio signal.

When the sound compression encoder/decoder 23 receives data at 300 kbits/sec, it is possible to expand the compressed data and reproduce continuous sound. On the other hand, as mentioned above, the optical pickup 14 reads a digital signal from the optical disc 11B at a transmission rate of 1.4 Mbits/sec. The memory 15 of 1 Mbits becomes full with a digital signal in approximately 0.9 seconds. Even if a digital signal is not read from the optical disc 11B due to vibration or the like, a reproduced signal can be continuously outputted from the memory 25 for approximately three seconds at 300 kbits/sec. During this period, the optical pickup 14 can reaccess the original position of the optical disc 11B so as to read the record signal. Thus, a so-called sound jump can be prevented.

Data which has been expanded by the sound compression encoder/decoder 23 is supplied to the D/A converter 30. The D/A converter 30 restores a digital signal to an analog signal. The resultant analog audio signal is outputted from the output terminal 31.

Figure 3:
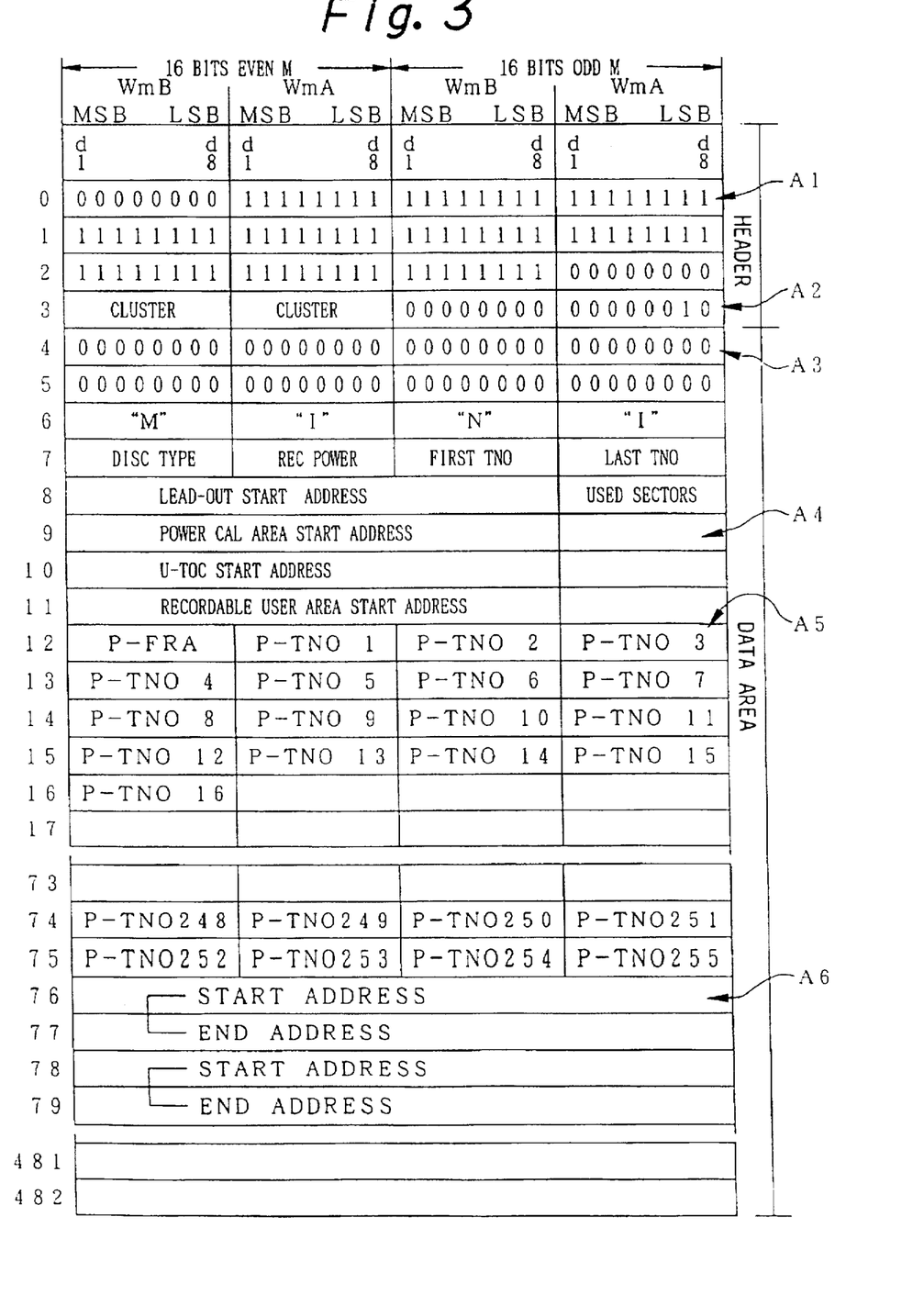
FIGS. 3 and 4 are schematic diagrams for explaining a TOC in the embodiment of the invention.

A TOC is disposed on the innermost periphery of the optical disc 11B. The TOC stores information with respect to positions of data recorded on the optical disc 11B. FIG. 3 shows the construction of the TOC. The TOC is constructed of a header area and a data area. The header area starts with a fixed sync pattern area A1, followed by a header information area A2 which represents a cluster number and a sector number.

The data area starts with a fixed pattern area A3. The pattern area A3 is followed by an identification information area A4 which includes a disc type information (for example, a reproduction-only-disc, a recordable disc, or a disc having a reproduction-only region and a recordable region), a record power, a last track number, a lead-out start address, the number of sectors being used, a power calibration start address, a user TOC start address, a start address of a recordable user area, and so forth. The identification information area A4 is followed by a track number point area A5 (P-TNO1, P-TNO2, P-TNO3, and so forth). The track number points (P-TNO1, P-TN02, P-TNO3, and so forth) are pointers which represent positions in the TOC with respect to information of the start address and end address of each track number. The track number point area A5 is followed by a track information area A6. Record positions in the TOC with respect to the information of the start address and end address of each track are recorded in the track information area A6. The record positions in the TOC with respect to the information of the start address and end address of each track are designated by the track number points (P-TNO1, P-TN02, P-TNO3, and so forth).

Figure 4:
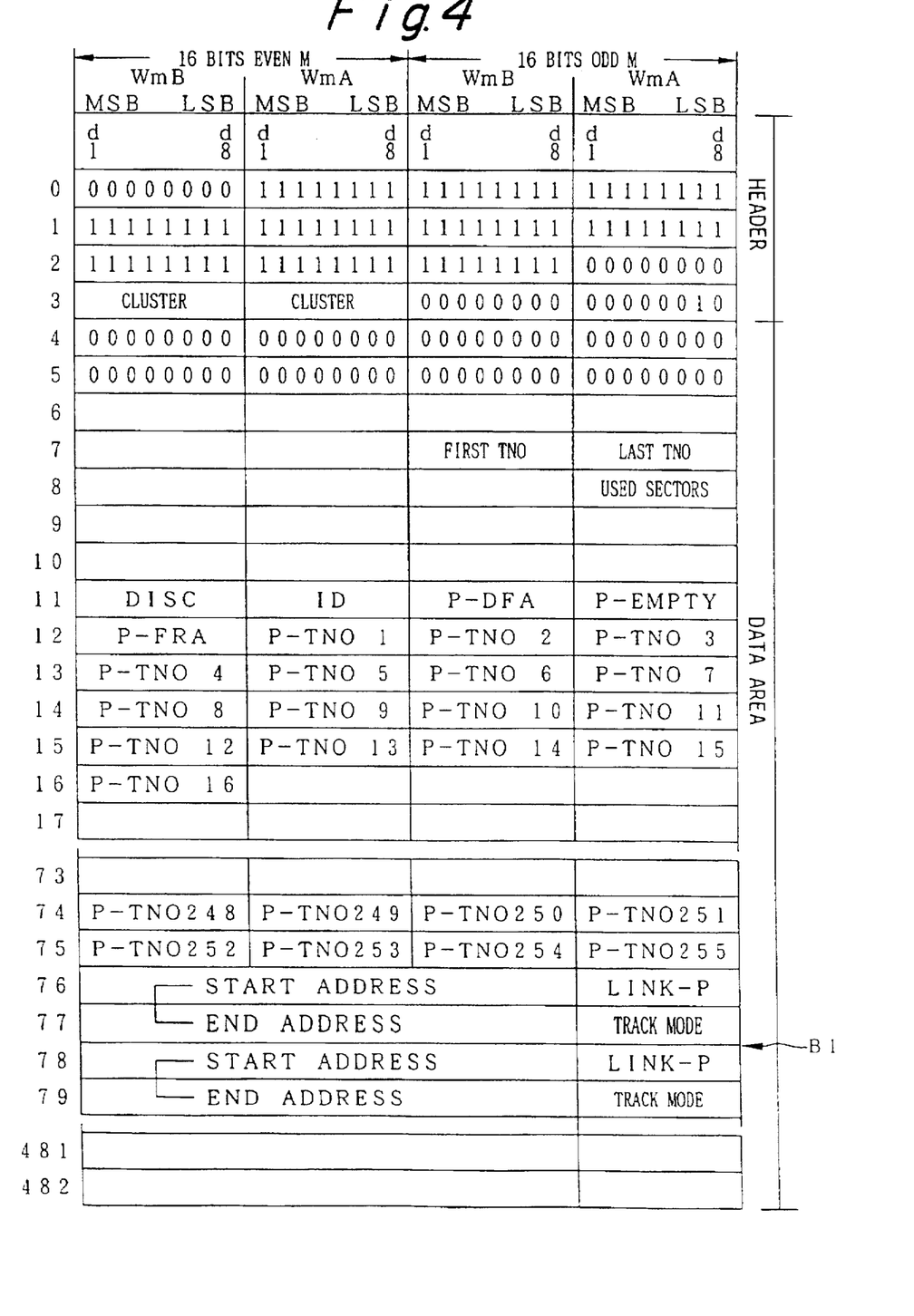

In addition, the optical disc 11B has a user TOC which is used to manage an audio signal being recorded. FIG. 4 shows the construction of the user TOC. The user TOC has information Link-P (denoted by B1) for each track information. The Link-P represents information of a track that follows. All the track information can be managed on the user TOC.

The TOC information is stored in a part of the memory 25 when the disc is loaded in the apparatus. When the user TOC is changed, it is changed in the memory 25. When a recording operation is completed, updated user TOC is recorded on the optical disc 11B.

When the record key 10 of the optical disc recording and/or reproduction apparatus is pressed, an audio signal received from the input terminal 21 is converted into a digital signal by the A/D converter 22. The digital signal is compressed by the first encoder/decoder 23. The compressed digital signal is temporarily stored in the memory 25. Thereafter, the second encoder/decoder 26 performs the error correction encoding and EFM modulating processes for the compressed digital signal. The resultant signal is record on the optical disc 11B by the optical pickup and the magnetic head 13.

In the present invention, when new audio data is record on the optical disc 11B, if the record key 10 is pressed while the reproducing operation is being stopped, the optical pickup 14 and the magnetic head 13 are moved to a non-recorded area of the optical disc 11B based on the information of the user TOC so as to prevent audio data which has been record on the optical disc 11B from erased. Then, recording of audio data is started from the non-recorded area of the optical disc 11B.

When such a control operation is always performed, new audio data cannot be recorded just after audio data which is being reproduced. To solve this problem, in the optical recording and/or reproduction apparatus, when the record key 10 is pressed while audio data is being reproduced or when the record key 10 is pressed (or both the record key 10 and the play key 4 are pressed at the same time) while the reproduction of audio data is being paused, new audio data is recorded just after audio data which has been reproduced.

Figure 5:
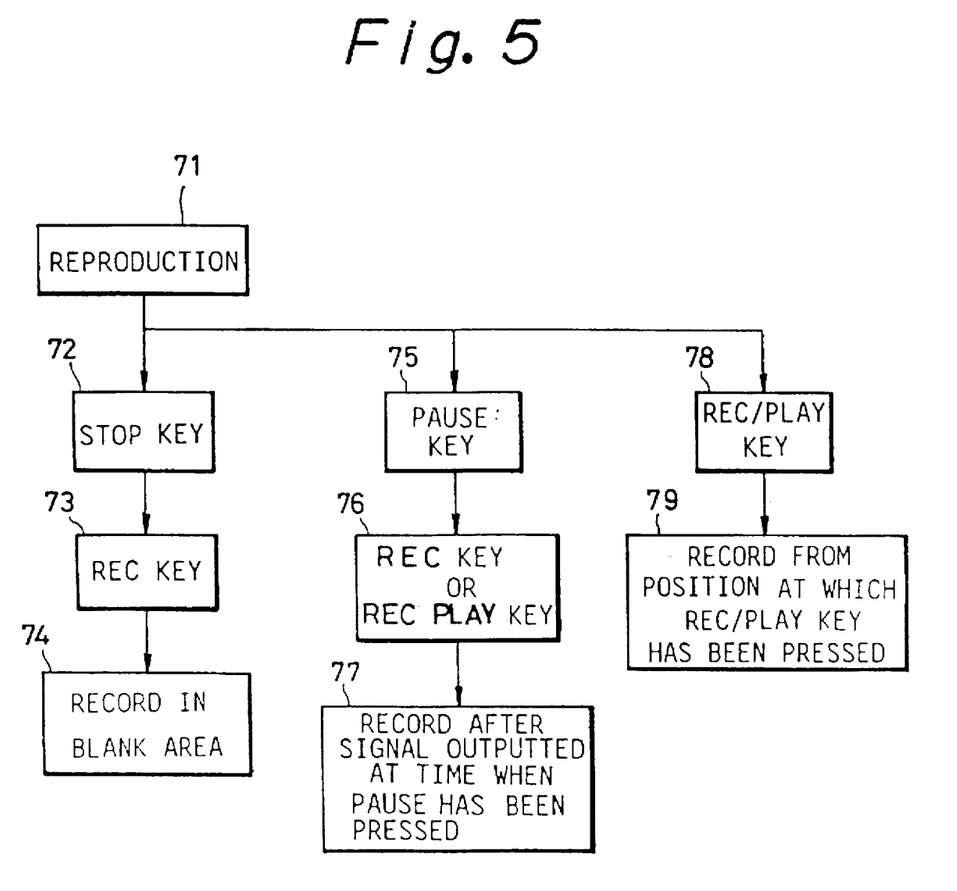
FIGS. 5 and 6 are flow charts for explaining the embodiment of the invention.

FIG. 5 is a flow chart for explaining the above-described operation. In FIG. 5, when the stop key 6 is pressed (at step 72), while audio data is being reproduced (at step 71), the reproducing operation is stopped. When the record key 10 is pressed (at step 73) while the reproducing operation is being stopped, a blank area of the disc is detected from the TOC information and newly input audio data is record in the blank area of the disc (at step 74).

When the pause key 5 is pressed (at step 75), while audio data is being reproduced (at step 71), a reproduction pause state takes place. In the reproduction pause state, when the record key 10 is pressed or both the record key 10 and the reproduction key 4 are pressed at the same time (at step 76), newly input audio data is recorded just after audio data which is being paused for reproduction (at step 77). When both the reproduction key 4 and the record key 10 are pressed at the same time (at step 78), while audio data is being reproduced (at step 71), the reproducing operation of the audio data is stopped and newly input audio data is recorded after the position at which the reproducing operation of the audio data has been stopped (at step 79).

In the optical recording and/or reproduction apparatus, when the reproduction key 4 is pressed, the magnetic head 13 and the optical pickup 14 are moved to the start position of a first music program or a designated music program. The second encoder/decoder 26 performs EFM demodulating and error correcting processes for the audio data which is read from the disc 11B. The resultant data is expanded by the first encoder/decoder 23 and converted into an analog audio signal by the D/A converter 30. The analog audio signal is outputted from the output terminal 31.

As mentioned above, normally, audio data is reproduced from the beginning of a first music program or a designated music program. To improve the operability of recording new audio data and checking the recorded state of the recorded audio data, in the optical disc record and/or reproduction apparatus according to the embodiment, when the reproduction key 10 is pressed after a recording operation has been stopped, a reproducing operation is started from the beginning of the audio data which has been just recorded.

Figure 6:
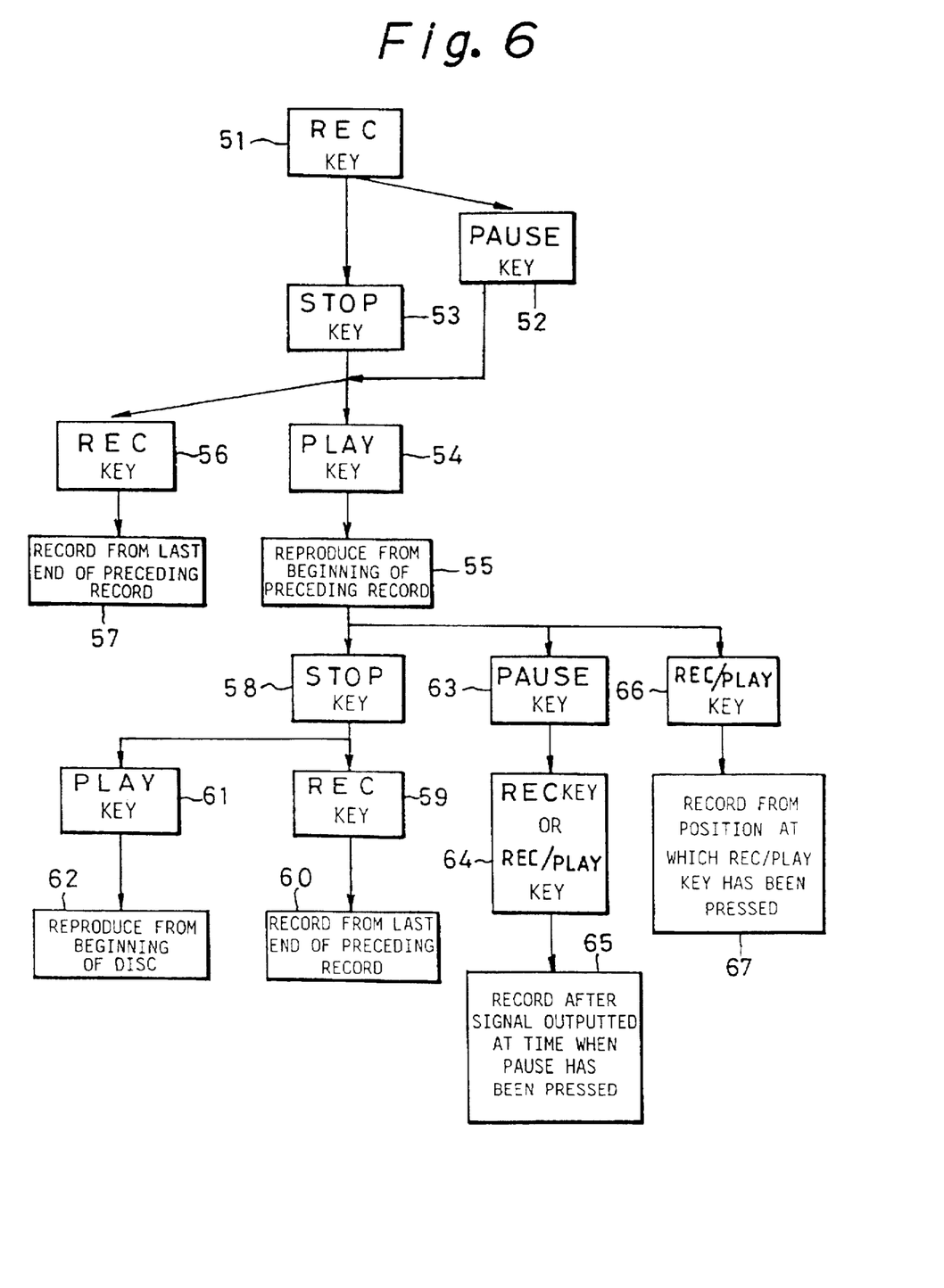

FIG. 6 is a flow chart for explaining the above-described operation. In FIG. 6, when the record key 10 is pressed (at step 51), a record state is set. When the pause key 5 or the stop key 6 is pressed (at step 52 or 53) while the recording operation is being performed, the record state is stopped. Thereafter, when the reproduction key 4 is pressed (at step 54), audio data which has been just recorded is reproduced from the beginning thereof (at step 55).

After the recording operation has been stopped at step 53, when the record key 10 is pressed again (at step 56), recording is started again from the end position of the previous recording (at step 57).

When the stop key 6 is pressed (at step 58) while a reproduction state is set at step 55, the reproduction state is stopped. Thereafter, when the record key 10 is pressed (at step 59), next audio data is recorded after the end position of the audio data which has been just record (at step 60).

Figure 7A:
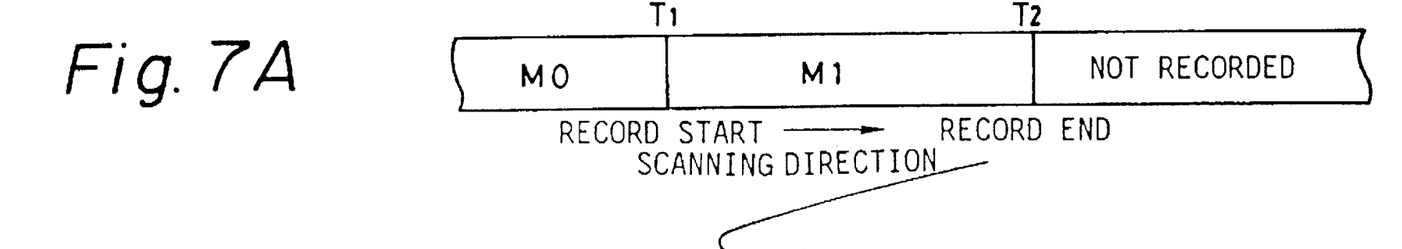
FIGS. 7A–7C, 8A–8C, 9 and 10 are schematic diagrams for explaining the embodiment of the invention.
Figure 7B:
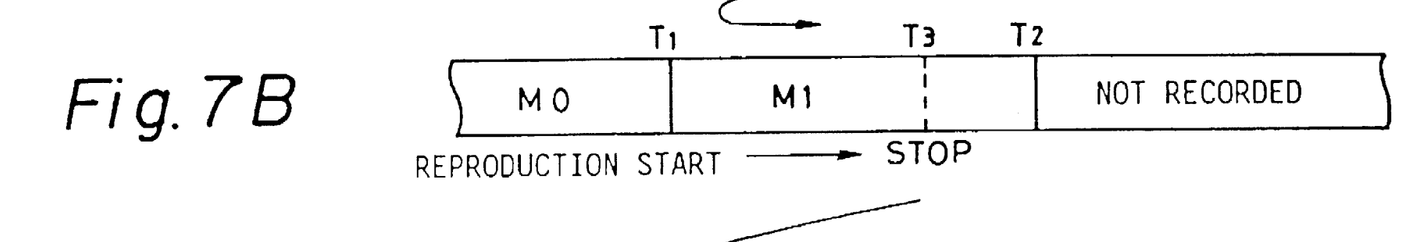
Figure 7C:
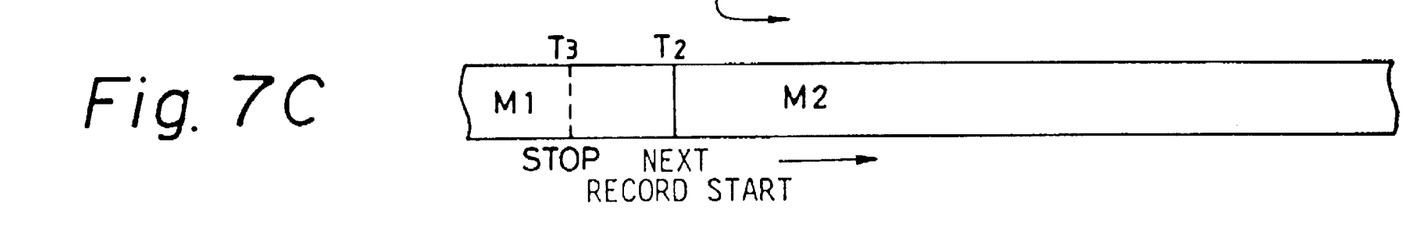

FIGS. 7A-7C shows record and reproducing states on the disc during steps 51 to 57. As shown in FIGS. 7A-7C, when the record key 10 is pressed at step 51, tape position $T_1$ and then the stop key 6 or the pause key 5 is pressed at steps 53 or 52, tape position $T_2$, an audio data stream M1 is record from the position $T_1$ to the position $T_2$. Thereafter, when the reproduction key 4 is pressed at step 54, a reproducing operation is started from the record start position $T_1$ as shown in FIG. 7B.

Now assume that the stop key 6 has been pressed at step 53, tape position $T_3$ and after the reproducing operation has been stopped, the record key 10 is pressed at step 56. In this case, after the record end position $T_2$ of the audio data M1 which has been just recorded is accessed, next audio data M2 is record as shown in FIG. 7C. Thus, the audio data M1 which is just followed by the audio data M2 is not erased.

When the reproduction key 4 is pressed again (at step 61) after the stop key 6 has been pressed at step 58, a reproducing operation is started from the first music program of the disc (at step 62).

When the pause key 5 is pressed (at step 63) while a reproducing operation is being performed at step 55, the reproducing operation is paused. Thereafter, when the record key 10 is pressed or when both the record key 10 and the reproduction key 4 are pressed at the same time (at step 64), record of next audio data is started from the pause position. In other words, next audio data is overwritten from the middle portion of the audio data which has been record (at step 65). When both the record key 10 and the reproduction key 4 are pressed at the same time (at step 66) while a reproduction state is set at step 55, record is started from the position where the keys have been pressed (at step 67).

Figure 8A:
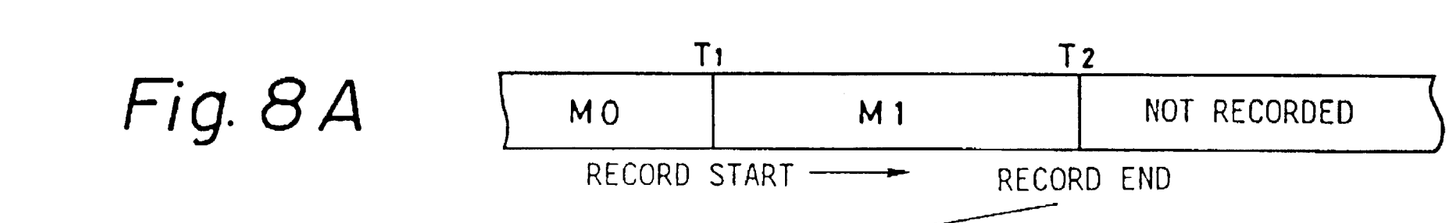
Figure 8B:
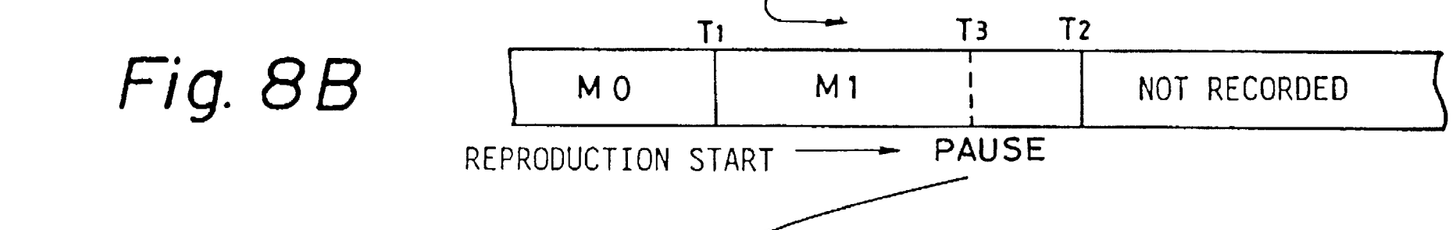
Figure 8C:
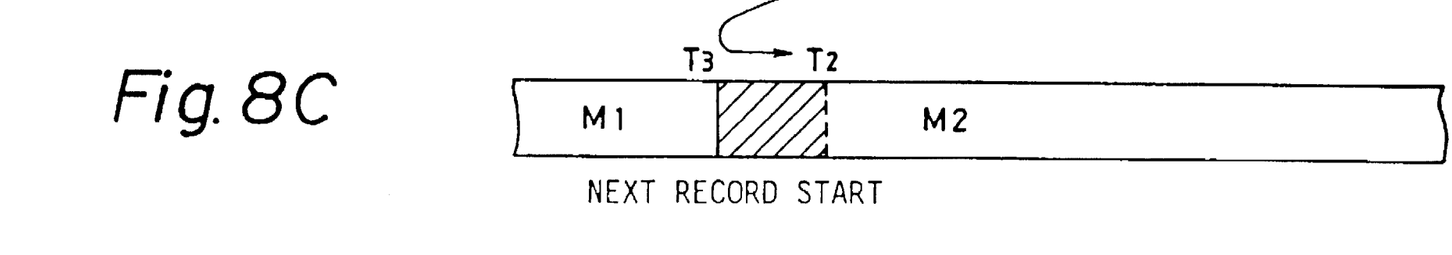

More specifically, in FIGS. 8A–8C, when the record key 10 is pressed at the position $T_1$ and the stop key 6 or the pause key 5 is pressed at the position $T_2$, an audio data stream M1 is record from the position $T_1$ to the position $T_2$. Thereafter, when the reproduction key 4 is pressed at step 54, a reproducing operation is started from the record start position $T_1$ of the audio data M1 which has been just recorded as shown in FIG. 8B. Now assume that after the pause key 5 has been pressed at the step 63, tapes position $T_3$, the record key 10 is pressed at step 64. In this case, as shown in FIG. 8C, the next audio data M2 is record from the position $T_3$ where the pause key 5 has been pressed. The hatched portion of the audio data M1 which has been recorded after the position $T_3$ is overwritten with the current audio data M2 and erased.

Figure 9:
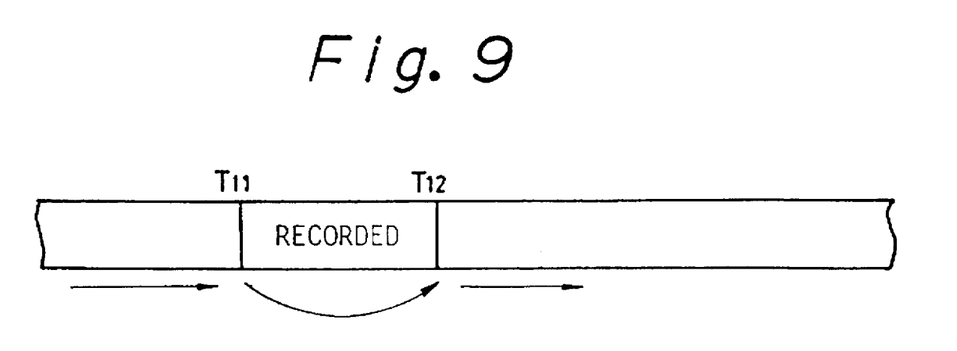
Figure 10:
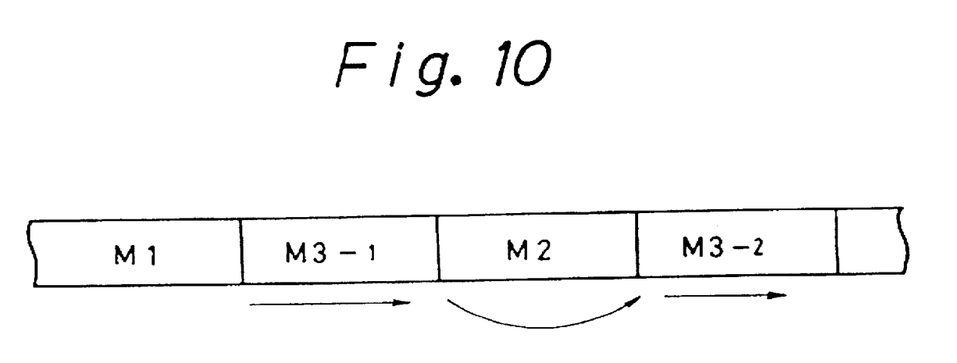

The record start position and record end position are obtained by reproducing track information of the TOC shown in FIG. 4. When recording is performed, a blank area of the disc is accessed. Referring to FIG. 9 for example, in the case that an area between the positions $T_{11}$ and $T_{12}$ is a data area and other areas (before the position $T_{11}$ and after the position $T_{12}$) are blank areas, when next audio data is recorded, the data area between the positions $T_{11}$ and $T_{12}$ is skipped so as to prevent the audio data recorded in the data area from being erased. Thus, as shown in FIG. 10, an audio data stream (music programs) is not always record in physically continuous positions. The positions of audio data which are continued are represented by the above-mentioned Link-P.

We claim:

1. A disc recording/reproducing apparatus, comprising:

recording means, including a recording head, for storing compressed input digital data in a memory, reading a burst of said digital data from said memory, record said digital data to a data area on a disc, and recording position information of the recorded data in a lead-in area disposed on an innermost peripheral portion of said disc; and reproducing means for reproducing data from said disc on the basis of said position information, storing the data in said memory, reading the data from said memory at a constant rate, expanding the data, and outputting the data, record commanding means for commanding a start of record operation, means for moving said recording head to a blank area on said disc responsive to said record position information and recording said input data in the blank area when said record commanding means commands a start of recording operation after the reproduction operation of said reproducing means has been stopped without intervening recording or reproducing of data.

2. The disc record/reproducing apparatus as set forth in claim 1, wherein said apparatus is adapted to move said recording head to a non-record area of blank areas responsive to said position information and perform a recording operation.

3. A disc recording/reproducing apparatus, comprising:

recording means for storing compressed input digital data in a memory, reading a burst of said digital data from said memory, recording said digital data to a data area on a disc, and recording position information of the recorded data in a lead-in area disposed on an innermost peripheral portion of said disc; and reproducing means for reproducing data from said disc on the basis of said position information, storing the data in said memory, reading the data from said memory at a constant rate, expanding the data, and outputting the data, pausing reproduction in response to a pause command, and outputting a position signal indicating a pause position where reproduction has been paused, means for moving said recording head to said pause position indicated by said position signal and starting a recording operation for said input data from said pause position when said record commanding means commands a start of recording operation while said reproducing operation is paused.

4. The disc recording/reproducing apparatus as set forth in claim 3, further comprising means for recording in said lead-in area reproducing sequence information of programs being recorded and wherein recording is performed until the end position of a music program being paused and recording is successively performed in a sequence based on said reproducing sequence information when said recording operation is started from the position at which said pause state takes place.

5. A disc recording\reproducing apparatus, comprising:

recording means for storing compressed input digital data in a memory, reading a burst of said digital data from said memory, recording said digital data to a data area on a disc, and recording position information of the recorded data in a lead-in area disposed on an innermost peripheral portion of said disc; and reproducing means, including a reproducing bead, for reproducing data from said disc on the basis Of said position information, storing the data in said memory, reading the data from said memory at a constant fate, expanding the data, and outputting the data, reproduction commanding means for commanding a start of a reproducing operation by the reproducing means and for moving said reproducing head to a start position of a digital data stream and starting a reproducing operation for said digital data stream from said start position when said reproduction commanding means is activated for the first time after said digital data stream has been record and a record operation is paused.

6. The disc recording\reproducing apparatus as set forth in claim 5 further comprising means for moving said reproducing head to a start position of said disc and starting said reproducing operation from said start position when said reproduction commanding means is activated after said reproducing operation for said digital data stream has been stopped.

7. The disc recording\reproducing apparatus as set forth in claim 5 further comprising a recording head in said recording means, record commanding means for commanding a start of a recording operation and means for moving said recording head to an end position of said digital data stream and starting a recording operation for input digital data from said end position when said record commanding means is activated after said reproducing operation for said digital data stream has been stopped.

8. The disc recording\reproducing apparatus as set forth in claim 5 further comprising a recording head in said recording means, record commanding means for commanding a start of a recording operation and means for moving said recording head to a position where said reproducing operation is paused and starting a recording operation from said position when said record commanding means is activated when said reproducing operation is paused.

* * * * *

UNITED STATES PATENT AND TRADEMARK OFFICE
CERTIFICATE OF CORRECTION

PATENT NO. : 5,633,841
DATED : May 27, 1997
INVENTOR(S) : TEPPEI YOKOTA ET AL.

It is certified that error appears in the above-indentified patent and that said Letters Patent is hereby corrected as shown below:

Column 9, line 24, "record" should be "recording"

Column 9, line 33, "record/reproducing" should be "recording/reproducing"

Column 10, line 17, "bead" should be "head"

Column 10, line 18, "Of" should be "of"

Column 10, line 20, "fate" should be "rate"

Signed and Sealed this

Sixteenth Day of September, 1997

Attest:

BRUCE LEHMAN

Attesting Officer

Commissioner of Patents and Trademarks